(12) United States Patent
Garrod et al.

(10) Patent No.: US 8,184,039 B2
(45) Date of Patent: May 22, 2012

(54) LEVEL SENSING DEVICE

(75) Inventors: Adrian George Garrod, Southampton (GB); Katherine Moore, Southampton (GB); David Sherry, Alresford (GB)

(73) Assignee: Siemens Aktiengesellschaft, Munich (DE)

( * ) Notice: Subject to any disclaimer, the term of this patent is extended or adjusted under 35 U.S.C. 154(b) by 324 days.

(21) Appl. No.: 12/531,091

(22) PCT Filed: Mar. 7, 2008

(86) PCT No.: PCT/GB2008/050161
§ 371 (c)(1),
(2), (4) Date: Sep. 14, 2009

(87) PCT Pub. No.: WO2008/114043
PCT Pub. Date: Sep. 25, 2008

(65) Prior Publication Data
US 2010/0060512 A1    Mar. 11, 2010

(30) Foreign Application Priority Data
Mar. 22, 2007   (GB) .................................. 0705449.7

(51) Int. Cl.
*G01S 13/08* (2006.01)
(52) U.S. Cl. ........................................ 342/124; 342/175
(58) Field of Classification Search .................. 342/124, 342/175
See application file for complete search history.

(56) References Cited

U.S. PATENT DOCUMENTS

| | | | |
|---|---|---|---|
| 5,546,088 A * | 8/1996 | Trummer et al. ............. | 342/124 |
| 6,014,100 A * | 1/2000 | Fehrenbach et al. .......... | 342/124 |
| 6,028,560 A | 2/2000 | Mahr | |
| 6,191,724 B1 * | 2/2001 | McEwan .......................... | 342/21 |
| 6,366,245 B1 | 4/2002 | Beez | |
| 6,927,734 B2 * | 8/2005 | Serban et al. ................. | 343/703 |
| 7,068,213 B2 * | 6/2006 | Muller et al. ................. | 342/124 |
| 7,075,480 B2 * | 7/2006 | Fehrenbach et al. .......... | 342/124 |
| 7,173,436 B2 * | 2/2007 | Edvardsson ................... | 324/644 |
| 7,233,278 B2 * | 6/2007 | Eriksson ........................ | 342/124 |
| 7,586,450 B2 * | 9/2009 | Muller ........................... | 343/703 |
| 7,924,216 B2 * | 4/2011 | Delin ............................. | 342/124 |
| 7,924,217 B2 * | 4/2011 | Jirskog ......................... | 342/124 |
| 8,040,274 B2 * | 10/2011 | Wendler et al. ............... | 342/124 |
| 8,085,187 B2 * | 12/2011 | Gard ............................. | 342/124 |
| 2004/0056667 A1 | 3/2004 | Hardell | |
| 2005/0035901 A1 * | 2/2005 | Lyon ............................. | 342/124 |
| 2005/0093738 A1 | 5/2005 | Kondoh | |
| 2005/0225480 A1 | 10/2005 | Fehrenbach | |
| 2005/0280573 A1 * | 12/2005 | Janitch et al. ................. | 342/124 |
| 2007/0139256 A1 * | 6/2007 | Edvardsson ................... | 342/124 |
| 2007/0200749 A1 * | 8/2007 | McEwan ....................... | 342/124 |
| 2010/0052974 A1 * | 3/2010 | Corbe et al. ................... | 342/124 |
| 2010/0060512 A1 * | 3/2010 | Garrod et al. ................. | 342/124 |
| 2010/0090883 A1 * | 4/2010 | Chen et al. .................... | 342/124 |
| 2010/0103024 A1 * | 4/2010 | Schultheiss et al. .......... | 342/124 |
| 2011/0140951 A1 * | 6/2011 | Nyberg ......................... | 342/124 |

FOREIGN PATENT DOCUMENTS

EP        2219045 A1 *   8/2010

* cited by examiner

*Primary Examiner* — John B Sotomayor

(57) ABSTRACT

A level sensing device with a high frequency radar system is provided. The radar system includes a radar high frequency module, a carrier board and a controller. The radar high frequency module is mounted on the carrier board using surface mount techniques. The controller includes a processor and the radar high frequency module has a plurality of components including one or more microwave integrated circuits, a radiating patch antenna, and coupling means for channeling a radiated signal from the patch antenna out of the module. The components are encapsulated to form the module and the coupling means includes a dielectric rod.

9 Claims, 4 Drawing Sheets

LEVEL SENSING DEVICE

CROSS REFERENCE TO RELATED APPLICATIONS

This application is the US National Stage of International Application No. PCT/GB2008/050161 filed Mar. 7, 2008 and claims the benefit thereof. The International Application claims the benefits of Great Britain Application No. 0705449.7 GB filed Mar. 22, 2007; both of the applications are incorporated by reference herein in their entirety.

FIELD OF INVENTION

This invention relates to a level sensing device using a high frequency radar system, in particular for range finding and level sensing of bulk materials, or fluids.

SUMMARY OF INVENTION

For radars operating at high frequencies (HF) using monolithic microwave integrated circuits (MMICs) packaged as bare die, construction costs have traditionally been high. In addition, the transition to the antenna has required complex precision construction and the MMICs are delicate components requiring protection which further complicates the issue of manufacture. Conventionally, modules with the MMICs mounted onto them are connected to carrier circuit boards using bond wires or soldered wire links. The complete assembly then has to be protected in a housing. Antenna connections are frequently made using precision transitions to waveguide, which can be time consuming and expensive to manufacture. Furthermore, for level sensing, the size of aperture available to operate the radar through is limited and at conventional frequencies this can lead to poor resolution. However, increasing the frequency of operation leads to higher costs for components and manufacturing. In addition, level sensing, or range finding to determine quantities of bulk materials, particularly powdered materials, such as cement or flour, takes place in an environment which is hostile for electronic components. Fluid level monitoring may take place in remote situations, where maintenance is difficult, so a reliable device is particularly important.

In accordance with a first aspect of the present invention, a level sensing device comprises a high frequency radar system, the system comprising a radar high frequency module, a carrier board and a controller; wherein the radar high frequency module is mounted on the carrier board using surface mount techniques; wherein the controller comprises a processor; wherein, the radar high frequency module comprises a plurality of components including one or more monolithic microwave integrated circuits (MMICs) packaged as bare die, a radiating patch antenna, and coupling means for channelling a radiated signal from the patch antenna out of the module, wherein the radar high frequency module components are encapsulated to form the module; and, wherein the coupling means comprises a dielectric rod.

The present invention addresses the problems caused by the physical environment in which the level sensing device must operate, by providing a compact, well protected package, using a dielectric rod, rather than a traditional antenna and complicated waveguide transitions.

The system can operate over a wide frequency range, but preferably, the radar system operates in the millimeter band.

This gives improved resolution and higher gain for a given available aperture size.

Typically, the operating frequency is between 40 and 120 GHz, more typically in the region of about 75 to 85 GHz.

This frequency range gives particularly good results for returns off dry or dusty materials.

Preferably, the components are encapsulated with a material which provides screening of the microwave components.

The packaging provides both physical protection from the environment, and protection from electrical interference. Providing both a screening and a protective function in the same part is convenient and saves in manufacturing costs.

Preferably, the controller causes a radiated signal to be channelled toward a target material; wherein a return radar signal is received in the radar system; and wherein the processor processes the return signal to determine a level of the target material.

This can be used on any type of target material to determine its level at the point to which the signal is directed.

The invention can be used for determining levels of fluids or bulk products in open environments, such as rivers or gravel yards, but in one embodiment, the target material is in a container.

The return signal can be used in combination with a known total height of the container to determine where the level of the material is.

Preferably, the processor extracts from a store, information relating to the target material and the container, and derives an approximate volume of the material in the container.

This can be helpful to determine how soon a silo e.g. on a production line for concrete structures, needs to be refilled based on the amount of material remaining and likely rate of use.

The level sensor may be used on many different objects, but typically, the target material comprises a fluid or bulk product, for example concrete, flour, grain or oil. Alternatively, in open air situations, the fluid may be water, such as reservoir levels, or waste products, such as in sewage treatment.

BRIEF DESCRIPTION OF THE DRAWINGS

An example of a level sensing device using a high frequency radar system according to the present invention will now be described with reference to the accompanying drawings in which.

DETAILED DESCRIPTION OF INVENTION

Figure 1:
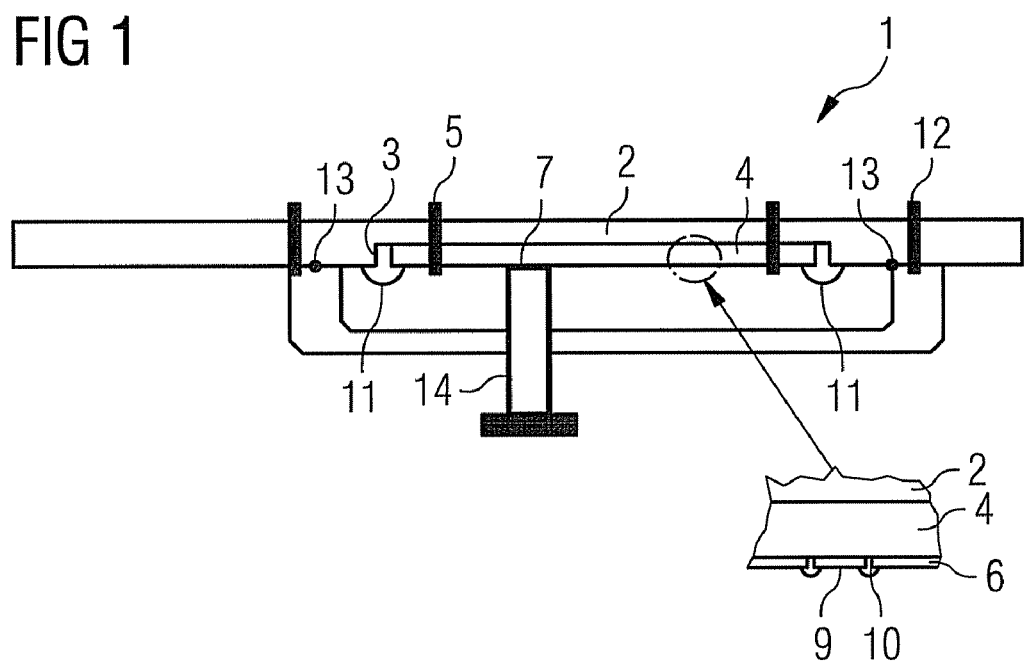
FIG. 1 illustrates a conventional construction of a radar module.

FIG. 1 illustrates a conventional construction of a radar module 1. A radar technology printed circuit board (PCB) 2 is provided with a recess 3 into which a radio frequency (RF) substrate 4 is located and fitted by locating pins, or fixings 5. A waveguide transition 7 is provided on a high frequency module which is illustrated in more detail in the exploded section of FIG. 1. The RF substrate, or metal backing 4 contacts a ground plane of the PCB 2. Dielectric and MMIC components 6, 9 are provided on the RF substrate 4 and joined via bondwires 10. The HF module is also electrically joined to the PCB via bondwires 11. In order to protect the HF module and its connection to the PCB, a casing is provided which is located by pins, or fixings 12 and sealed by seals 13. Conventionally, the output of the waveguide transition 7 is coupled into a waveguide 14 to exit the module.

Figure 2:
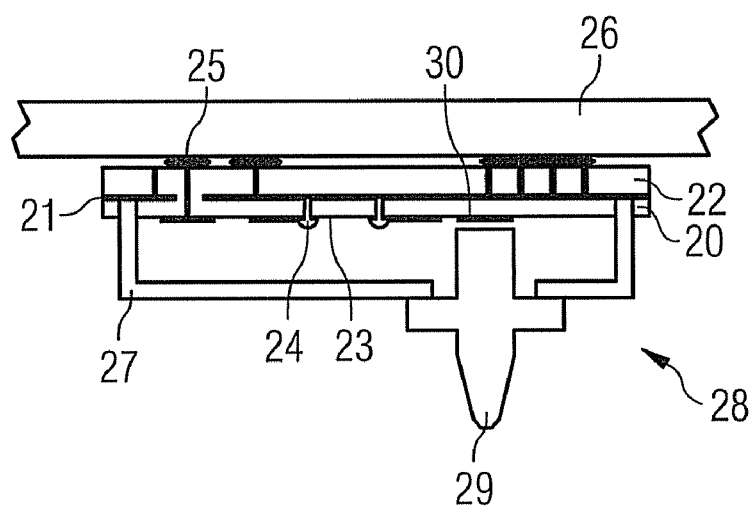
FIG. 2 illustrates construction of a high frequency radar module for use in a level sensing device according to the present invention.

The present invention solves the construction problems of the conventional device by packaging the MMICs in a module 28 that can be used as a component in standard printed circuit board assembly. This is shown in FIG. 2. The module is formed as a microwave substrate 20, such as liquid crystaline polymer (LCP), on a ground plane 21, supported by a rigidiser 22, which in this example is made from flame resistant 4 (FR4) material. MMICs 23 used in the radar HF module are mounted in pockets in the microwave substrate 20. Connections 24 are made from the MMICs 23 to the substrate 20 using bondwires. The connections are brought out through the rigidiser 22 using vias and surface mount pads 25 are formed on the FR4 rigidiser to allow the module to be connected to a radar technology carrier PCB 26. A screening can 27 is fitted to the edges of the substrate 20. The module 28 provides protection for the MMICs 23 by virtue of its enclosed structure. The radar HF module also includes a pre-focus rod 29 that is driven by a radiating patch antenna 30 to form part of the overall antenna system. The pre-focus rod captures radiation from the patch antenna on the HF module and channels the radiation along the length of the antenna. The end of the pre-focus rod is tapered to provide a launch of the channelled wave into free space. This can be used as the system antenna, or for illuminating a dielectric lens (not shown) placed in front of the dielectric rod to form narrow beams. Alternatively, the radiation may be fed into other beamforming type devices, such as a horn, a waveguide extended horn, or a reflector antenna.

Figure 3A:
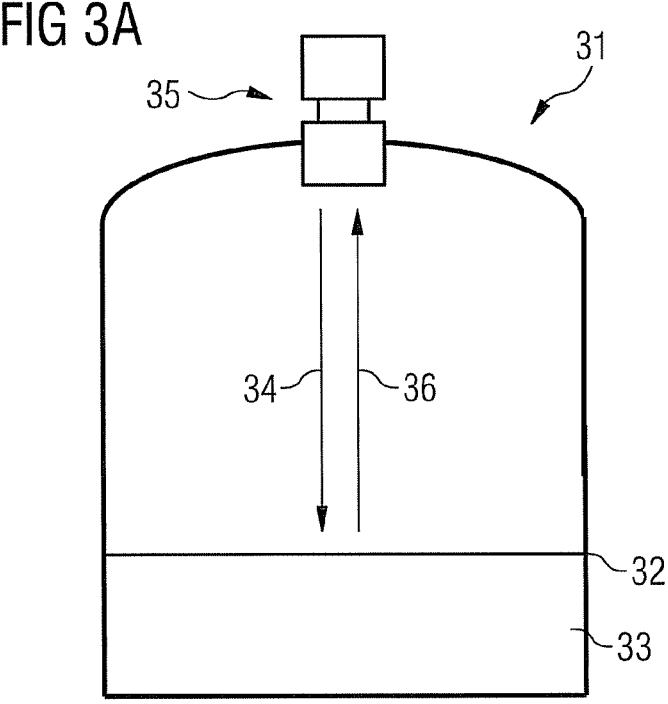
FIG. 3 illustrates two examples of use of a level sensing device using a high frequency radar system according to the present invention in an enclosed area.

An example of an application of the system of the present invention is shown in FIG. 3. FIG. 3a shows the use of level sensing in a storage vessel, or silo 31 at least partially filled 32 with bulk material 33, such as flour, grain, cement, or fluid such as oil, fuel, or water. A signal 34 is radiated from a level sensor 35 toward the fill level 32 of the material and the return 36 is received and processed in the system. The available aperture in a silo is limited by the desire to avoid making holes in the container. Conventional level sensors operate in the 6, 10 or 24 GHz range, whereas the preferred frequency range of the present invention is around 77 GHz which gives a higher gain for the available aperture in the vessel, as well as a better return off dry, or dusty solids.

Figure 3B:
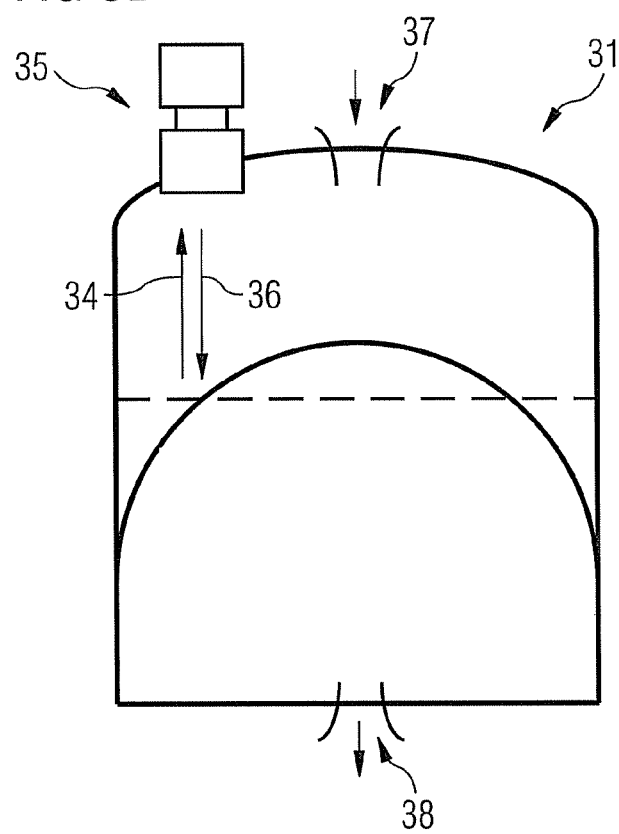

To measure the level of material within a container, the radar system emits radiation at a suitable frequency and the returns are processed in conjunction with known information about the overall height and volume of the container. Level sensing may be used as part of a process for controlling manufacture, so that the amount of material used up, or remaining in the silo 31 can be determined and appropriate top ups built into the production process to minimise downtime. Since filling and emptying of the silos is usually done through vents 37, 38 aligned along the axis, the position of the level sensing device can be offset to one side, or other of the central axis in the silo to obtain a more accurate estimate, as illustrated in FIG. 3b, so that the measured level can be treated as an approximation of the actual level if it were flat. In this example, an approximation of the remaining volume can be made since the return is not off the peak, but off an average point.

Figure 4:
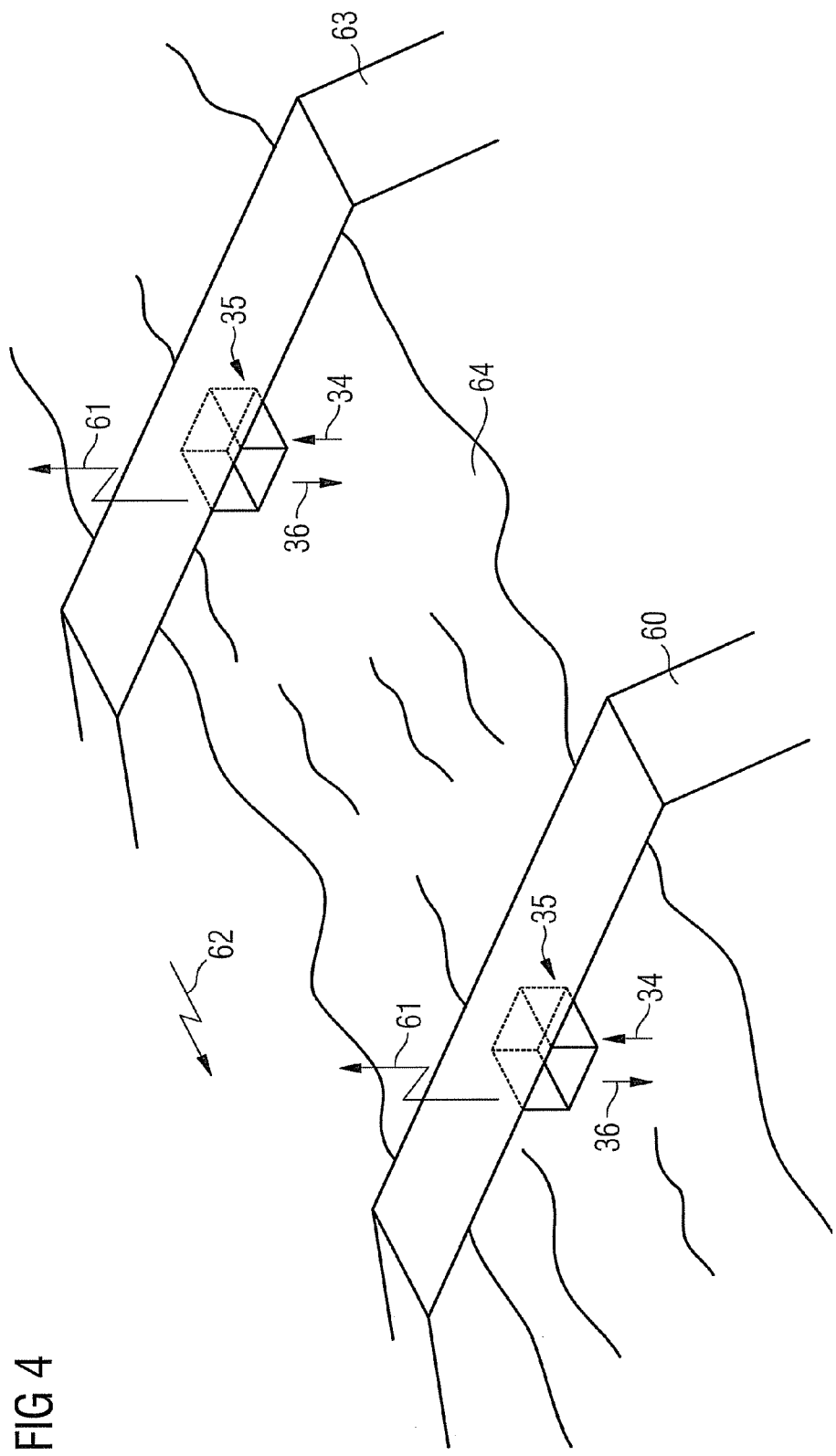
FIG. 4 illustrates an example of the present invention, used in an open environment; and, FIG. 5 is a block diagram of a level sensing device according to the present invention in more detail.

Another example of level sensing is in its application to measuring fluid levels in open environments. Examples of this include measuring height of water in a river or reservoir, or wave height beneath oil rigs, so that advance warning can be given of potentially dangerous situations. FIG. 4 illustrates an example of measuring river height. A level sensing device 35 according to the invention is installed beneath a bridge 60 over a river 64. At regular intervals, the radar system emits radiation 36 at a suitable frequency and the returns 34 are processed to determine the river level, or a change in level. Triggers can be set based on expected results for the river level at that point which, with a suitable wireless communication system (not shown), allows a wireless transmission 61 to send an alert if the level rises above the norm. If desired, data sent 62 from other points, e.g. a second bridge 63, upstream on the river 64 may be used in setting, or adapting the triggers.

Figure 5:
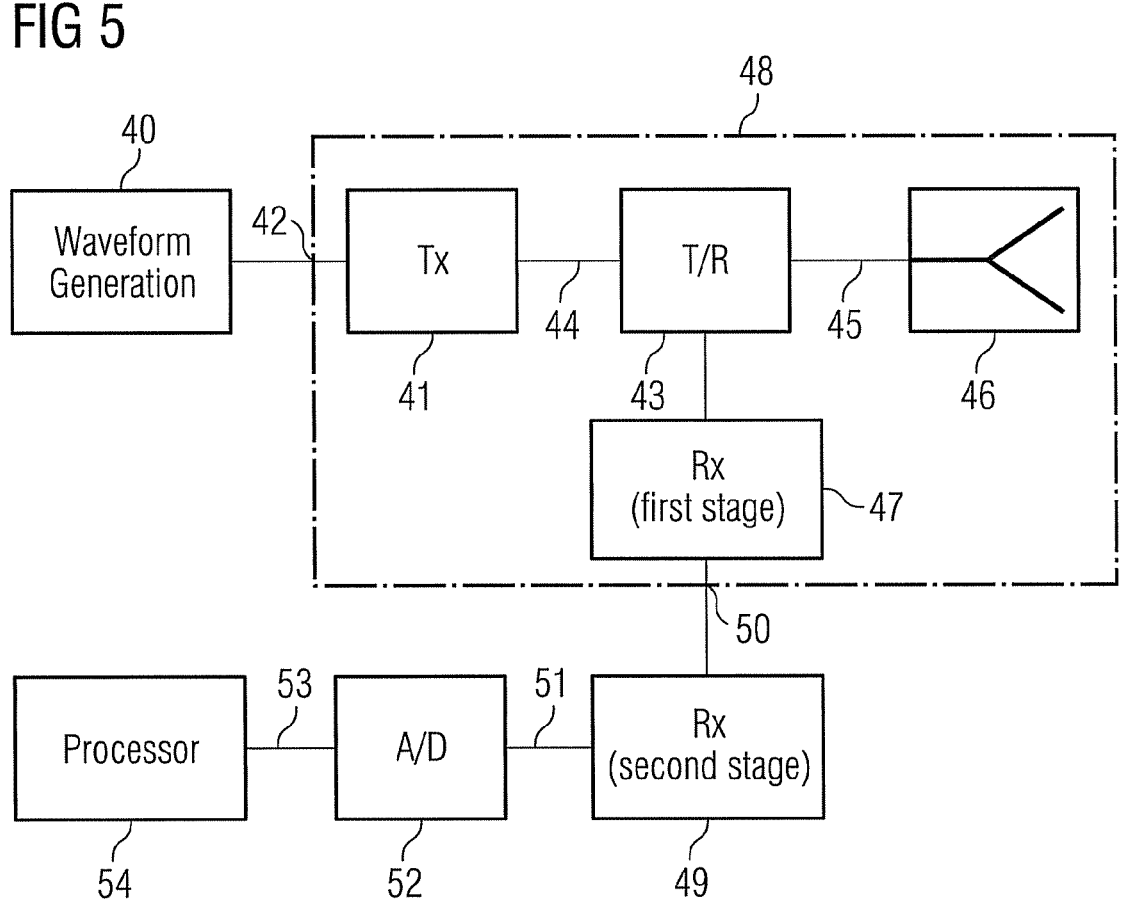

FIG. 5 illustrates a block diagram of a level sensing device according to the present invention in more detail. A waveform generator 40 produces the waveform required for the radar. A transmitter (Tx) 41 produces the required transmit power at the radar operating frequency in response to the waveform generator output 42. A transmit/receive (T/R) block 43 separates the transmitter signal 44 into an output 45 through an antenna from the return signal received through the antenna. A first stage receiver (Rx) 47 acts on the receiver signals to translate the return signal to a lower frequency for further processing. The transmitter 41, T/R block 43, antenna 46 and first stage receiver 47 are included in the HF module 48. A second stage receiver (Rx) 49 acts on the first stage receiver signals 50 to provide a drive signal 51 for an analogue to digital converter (ADC). The output 53 from the analogue to digital converter 52 is input to a digital processor 54. The processor block processes the return signal to determine a level of the target material, or fluid.

The present invention reduces the cost of manufacturing a system for operation at high frequencies by encapsulating all RF components in a single screened module, which can be incorporated into a manufactured item using production line surface mount techniques, rather than hand assembly and reduces the overall number of passes for each of the manufacturing steps. The components themselves may still be relatively expensive, but the modular structure allows a simple production facility to produce the radar systems without changing their equipment by buying in the modules. These can be made in a clean room by a company specialising in that type of manufacture, but the company producing the finished product does not need to invest in this type of facility.

The use of a dielectric rod to extract the radiation from the encapsulated package is a further simplification, in contrast to the use of waveguide transitions which are very complex to manufacture.

Unlike the conventional manufacturing process whereby a module was laid onto a carrier circuit board and bonded, then covered over for protection and other components were soldered onto the board in their positions afterwards, the present invention allows most of the assembly to be done in factories which do not have a clean room and the high frequency radar module is manufactured off-site by specialist, then incorporated as part of an assembly line.

The invention claimed is:
1. A level sensing device, comprising:
 a high frequency radar system, the radar system including
  a radar high frequency module,
  a carrier board, and
  a controller with a processor,
 wherein the radar high frequency module is mounted on the carrier board using surface mount techniques, the radar high frequency module comprising a plurality of components including one or more monolithic microwave integrated circuits (MMICs) packaged as bare die, a radiating patch antenna, and a dielectric rod for channelling a radiated signal from the patch antenna out of the module, wherein the plurality of components, the patch antenna and the dielectric rod are encapsulated to form the module.

2. The device according to claim 1, wherein the radar system has an operating frequency between 75 and 85 GHz.

3. The device according to claim 1, further comprising:

a target material, and a container, wherein the target material is in the container, and wherein the controller causes a radiated signal to be channelled toward the target material.

4. The device according to claim 3, wherein the target material comprises a fluid or bulk product.

5. A method of operating a level sensing device, comprising:

providing a high frequency radar system with a high frequency radar module, a carrier board and a controller with a processor, mounting the module on the carrier board, encapsulating high frequency radar module components to form the module, operating the high frequency radar system in a millimeter band, transmitting a radiated signal caused by a controller of the high frequency radar system towards a target material, receiving a return radar signal in the radar system, and determining a level of the target material by processing the return radar signal.

6. The method according to claim 5, wherein the radar high frequency module components comprise a plurality of components including one or more monolithic microwave integrated circuits (MMICs), a radiating patch antenna, and a dielectric rod for channelling a radiated signal from the patch antenna out of the module.

7. The method according to claim 6, further comprising:

screening the module components, wherein the components are encapsulated with a material which provides screening of the components.

8. The method according to claim 5, wherein an operating frequency is between 75 and 85 GHz.

9. The method according to claim 5, further comprising:

providing a container, wherein the target material is located in the container, extracting, from a store, information relating to the target material and the container by the processor, and deriving an approximate volume of the material in the container by the processor.

* * * * *